(12) United States Patent
Jiang et al.

(10) Patent No.: US 9,922,227 B2
(45) Date of Patent: *Mar. 20, 2018

(54) APPARATUS AND METHOD FOR IMPLEMENTING TOUCH CONTROL AND FINGERPRINT IDENTIFICATION

(71) Applicant: Xiaomi Inc., Beijing (CN)

(72) Inventors: Zhongsheng Jiang, Beijing (CN); Kun Yang, Beijing (CN); Jun Tao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,715

(22) Filed: Jan. 4, 2016

(65) Prior Publication Data

US 2016/0196462 A1 Jul. 7, 2016

(30) Foreign Application Priority Data

Jan. 7, 2015 (CN) .......................... 2015 1 0007416
Jan. 30, 2015 (CN) .......................... 2015 1 0050893

(51) Int. Cl.
*G06K 9/00* (2006.01)
*G06F 3/041* (2006.01)
(Continued)

(52) U.S. Cl.
CPC ....... *G06K 9/00013* (2013.01); *G06F 3/0416* (2013.01); *G06F 21/32* (2013.01);
(Continued)

(58) Field of Classification Search
CPC ............... G06F 3/03547; G06F 3/0488; G06F 2203/0338; G06F 21/32; G06F 3/05; G06K 9/00013; G06K 9/0002

USPC ............ 455/550.1, 556.1, 566; 345/173–175
See application file for complete search history.

(56) References Cited

U.S. PATENT DOCUMENTS

2010/0279738 A1 11/2010 Kim et al.
2012/0105081 A1 5/2012 Shaikh et al.
(Continued)

FOREIGN PATENT DOCUMENTS

CN 203117990 U 8/2013
CN 104049828 A 9/2014
(Continued)

OTHER PUBLICATIONS

"International Search Report for PCT/CN2015/093303".
Extended European Search Report for 16150450.1.

*Primary Examiner* — Sam Bhattacharya
(74) *Attorney, Agent, or Firm* — Jun He Law Offices P.C.; James J. Zhu (57) ABSTRACT

An apparatus for implementing touch control and fingerprint identification includes: a fingerprint identification sensor including a plurality of sub-sensors and configured to transmit a signal generated by detection of a plurality of sub-sensors to a fingerprint identification circuit when a combination switch is open circuited, and to combine the signal generated by the detection of the plurality of sub-sensors into a touch signal and transmit the touch signal to a touch control circuit when the combination switch is closed. The fingerprint identification circuit is configured to process the signal generated by the detection of the plurality of sub-sensors; and the touch control circuit is configured to determine presence of a touch operation according to the combined touch signal. Accordingly, the functions of fingerprint identification and touch control can be implemented by sharing a fingerprint identification sensor, so that integration level of an electronic device is improved.

14 Claims, 5 Drawing Sheets

(51) Int. Cl.
*G06F 21/32* (2013.01)
*G06F 3/044* (2006.01)
(52) U.S. Cl.
CPC .......... *G06K 9/00087* (2013.01); *G06F 3/044* (2013.01); *G06F 2203/04103* (2013.01)

(56) References Cited

U.S. PATENT DOCUMENTS

| | | |
|---|---|---|
| 2013/0223700 A1 | 8/2013 | Huang et al. |
| 2013/0287274 A1 | 10/2013 | Shi et al. |
| 2013/0346641 A1 | 12/2013 | Corlett |
| 2014/0047706 A1 | 2/2014 | Shaikh |
| 2014/0292666 A1 | 10/2014 | Shi et al. |
| 2014/0359757 A1 | 12/2014 | Sezan et al. |

FOREIGN PATENT DOCUMENTS

| | | |
|---|---|---|
| CN | 104063094 A | 9/2014 |
| CN | 104079718 A | 10/2014 |
| CN | 104732201 A | 6/2015 |
| EP | 1480157 A2 | 11/2004 |
| JP | 2000148376 A | 5/2000 |
| JP | 2002297305 A | 10/2002 |
| JP | 2004318892 A | 11/2004 |
| JP | 2004350744 A | 12/2004 |
| JP | 2006092428 A | 4/2006 |
| JP | 2006129620 A | 5/2006 |
| JP | 2007219671 A | 8/2007 |
| JP | 2008009616 A | 1/2008 |
| JP | 2012079283 A | 4/2012 |
| KR | 1020010083355 A | 9/2001 |
| RU | 2530227 C2 | 10/2014 |
| WO | 0159558 A1 | 8/2001 |
| WO | 2006/130822 A2 | 12/2006 |

APPARATUS AND METHOD FOR IMPLEMENTING TOUCH CONTROL AND FINGERPRINT IDENTIFICATION

CROSS-REFERENCE TO RELATED APPLICATIONS

This application claims priority to Chinese Patent Application 201510050893.5, filed on Jan. 30, 2015, and Chinese Patent Application 201510007416.0, filed on Jan. 7, 2015, the entire contents of which are incorporated herein by reference.

TECHNICAL FIELD

The present disclosure relates to electronic devices, and more particularly, to an apparatus and a method for implementing touch control and fingerprint identification, and a terminal device comprising such apparatus.

BACKGROUND

With more and more functions integrated within terminal devices such as mobile phones, it is more convenient for users to use terminal devices due to the integrated new functions.

Figure 1:
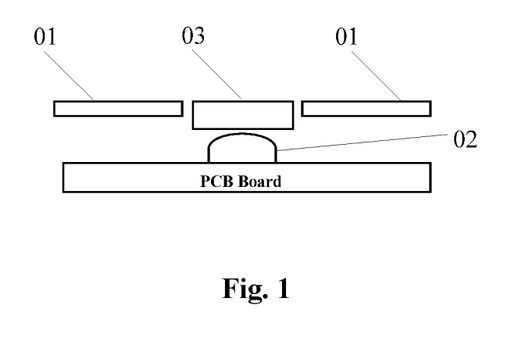
FIG. 1 is a schematic diagram illustrating a section view of a touch button in a conventional terminal device.

All major manufacturers of terminal devices bring their attention to fingerprint identification function recently. For conventional terminal devices such as mobile phones, tablet computers, when designing the fingerprint identification function, the fingerprint identification function is generally combined with a physical button, a section view of which is shown in FIG. 1, so as to make the fingerprint identification function compatible with the button. Generally, with such design, it is required to form an opening in a fingerprint identification area of a glass cover 01, because a physical button 02 can only be activated through a fixed travel of press. In this way, when a fingerprint identification sensor 03 is tapped by a user, only a fingerprint may be identified by the system. Moreover, when the fingerprint identification sensor 03 is pressed through a certain travel by the user, the physical button 02 may be activated, and two actions including fingerprint sensing and button-press may be identified by the system. Then, a corresponding action may be extracted according to decisions of a upper level processor in the terminal device. However, the exterior appearance of the terminal device is affected by the two-layers structure described above, and the user operation become inconvenient as well.

SUMMARY

There are provided an apparatus and a method for implementing functions of touch control and fingerprint identification, and a terminal device comprising such apparatus according to embodiments of the present disclosure, so as to improve integration level of the terminal device.

According to a first aspect of the present disclosure, there is provided an apparatus for implementing touch control and fingerprint identification. The apparatus includes: a fingerprint identification sensor, a fingerprint identification circuit, a combination switch and a touch control circuit, wherein the fingerprint identification sensor includes a plurality of sub-sensors; the plurality of sub-sensors are coupled to the fingerprint identification circuit, respectively, and coupled to the combination switch, respectively. The combination switch is coupled to the touch control circuit. The fingerprint identification sensor is configured to transmit signal generated by detection of the plurality of sub-sensors to the fingerprint identification circuit when the combination switch is open circuited, and to combine the signal generated by the detection of the plurality of sub-sensors into touch signal through the combination switch and transmit the touch signal to the touch control circuit when the combination switch is closed. The fingerprint identification circuit is configured to process the signal generated by the detection of the plurality of sub-sensors; and the touch control circuit is configured to determine presence of a touch operation according to the combined touch signal.

According to a second aspect of the present disclosure, there is provided a terminal device. The terminal device includes the apparatus for implementing touch control and fingerprint identification described above.

According to a third aspect of the present disclosure, there is provided a method for implementing touch control and fingerprint identification, which can be used in a terminal device comprising a combination switch and a fingerprint identification sensor with a plurality of sub-sensors. The method includes: receiving an instruction from a main processor in the terminal device, wherein the instruction indicates to switch the combination switch between an open-circuited state and a closed state; processing a signal generated by detection of the plurality of sub-sensors when the combination switch is open circuited; and combining the signal generated by the detection of the plurality of sub-sensors into a touch signal through the combination switch when the combination switch is closed and determining presence of a touch operation according to the combined touch signal.

According to a fourth aspect of the present disclosure, there is provided a device for implementing touch control and fingerprint identification, comprising: a processor; and a memory for storing instructions executable by the processor; wherein the processor is configured to perform: receiving an instruction from a main processor in the terminal device, wherein the instruction indicates to switch the combination switch between an open-circuited state and a closed state; processing a signal generated by detection of the plurality of sub-sensors when the combination switch is open circuited; and combining the signal generated by the detection of the plurality of sub-sensors into a touch signal through the combination switch when the combination switch is closed and determining presence of a touch operation according to the combined touch signal.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 2:
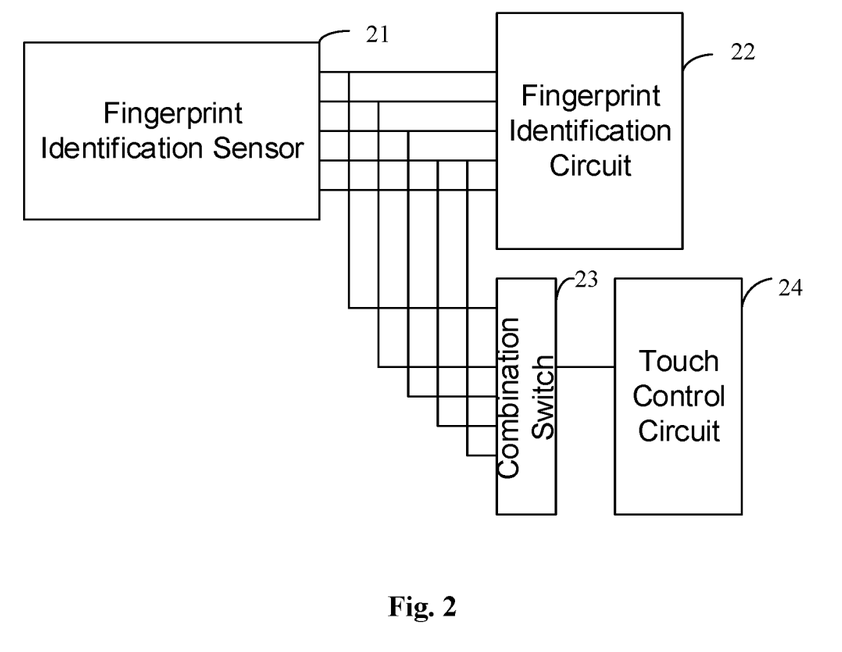
FIG. 2 is a block diagram illustrating an apparatus for implementing touch control and fingerprint identification according to an exemplary embodiment.

FIG. 2 is a block diagram illustrating an apparatus for implementing touch control and fingerprint identifications according to an exemplary embodiment. As shown in FIG. 2, the apparatus includes a fingerprint identification sensor 21, a fingerprint identification circuit 22, a combination switch 23 and a touch control circuit 24, wherein the fingerprint identification sensor 21 includes a plurality of sub-sensors.

The plurality of sub-sensors are coupled to the fingerprint identification circuit 22, respectively, and coupled to the combination switch 23, respectively. The combination switch 23 is coupled to the touch control circuit 24.

The fingerprint identification sensor 21 is configured to transmit a signal generated by detection of the plurality of sub-sensors to the fingerprint identification circuit 22 when the combination switch 23 is open circuited (off), and to combine the signal generated by the detection of the plurality of sub-sensors into a touch signal through the combination switch 23 and transmit the touch signal to the touch control circuit 24 when the combination switch 23 is closed (on).

The fingerprint identification circuit 22 is configured to process the signal generated by the detection of the plurality of sub-sensors.

The touch control circuit 24 is configured to determine presence of a touch operation according to the combined touch signal.

Figure 3:
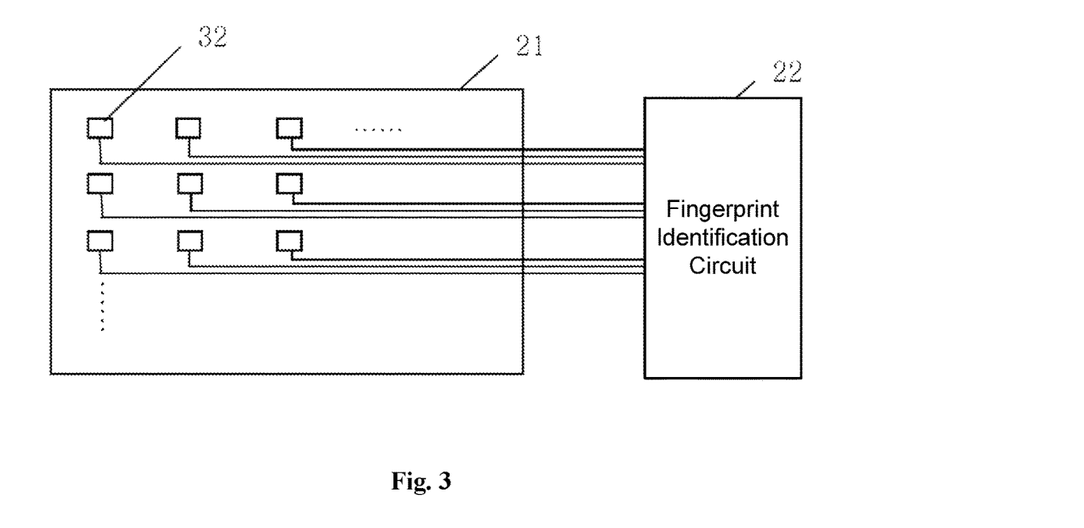
FIG. 3 is a block diagram illustrating a fingerprint identification mechanism with sub-sensors arranged in a dot array according to an exemplary embodiment.
Figure 4:
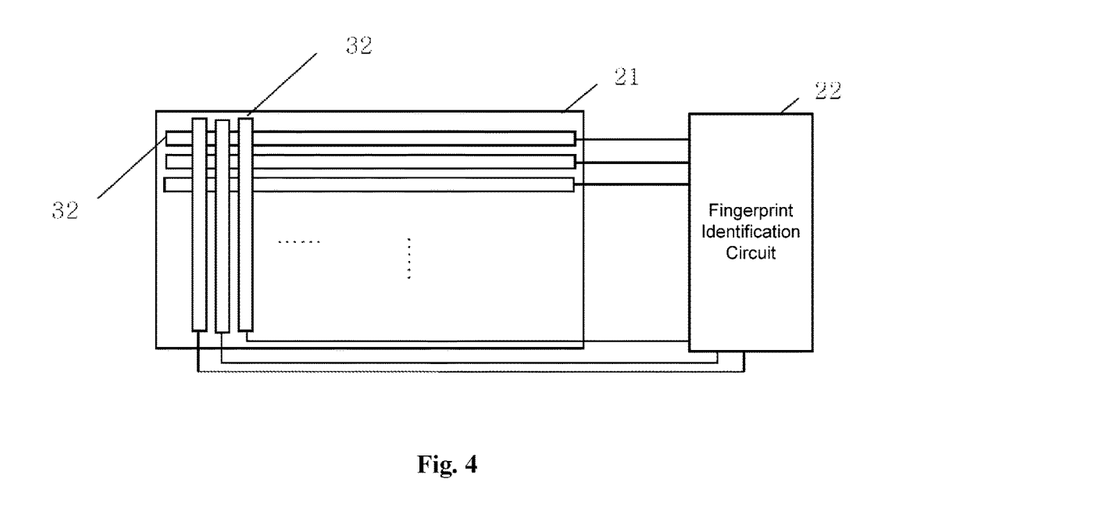
FIG. 4 is a block diagram illustrating a fingerprint identification mechanism with sub-sensors arranged in a rectangular array according to an exemplary embodiment.

In an embodiment, as shown in FIGS. 3 and 4, the plurality of sub-sensors are arranged in a dot array or in a rectangular array.

The fingerprint identification sensor includes a plurality of sub-sensors 32 (for example, one fingerprint identification sensor may include more than one thousand sub-sensors), which are configured to collect subtle information of various key points of a fingerprint. Thus, a complete or partial fingerprint image may be restored based on the information of those key points, such that the fingerprint image can be compared with a sample image to determine whether they are consistent with each other.

The signal indicative of the fingerprint information is transmitted to the fingerprint identification circuit 22 from the array of sub-sensors, either in the dot array or in the rectangular array, and is then processed by signal filtering, amplification and AD sampling. In this way, a digital signal with sufficient fingerprint information can be provided to a fingerprint identification chip. However, each sub-sensor in the array of sub-sensors may be unable to provide sufficient signal strength for the detection of a finger touch action due to the characteristics of a separate fingerprint identification sub-sensor, such as small size, low energy signal level, small response area and low sensitivity. Thus, the function of finger touch control cannot be normally implemented by the separate sub-sensor. Accordingly, the combination switch 23 may be closed to combine the signal generated by the detection of the sub-sensors into a touch signal, which is further transmitted to the touch control circuit 24. Thus, a signal with sufficient energy can be provided to the touch control circuit 24 to act as a touch control signal. Accordingly, in this situation, the fingerprint identification sensor 21 is able to receive touch signal and act as a "touch key" to achieve the function of a "physical button".

The technical solution according to embodiments of the present disclosure may provide, at least in part, the following advantageous effects. The functions of fingerprint identification and touch control can be implemented by sharing a fingerprint identification sensor, and external components for implementing the functions of fingerprint identification and touch control can be integrated into a single component without needing an additional physical button, so that the integration level of the electronic device is improved, and it is more convenient for the users to operate.

Figure 5:
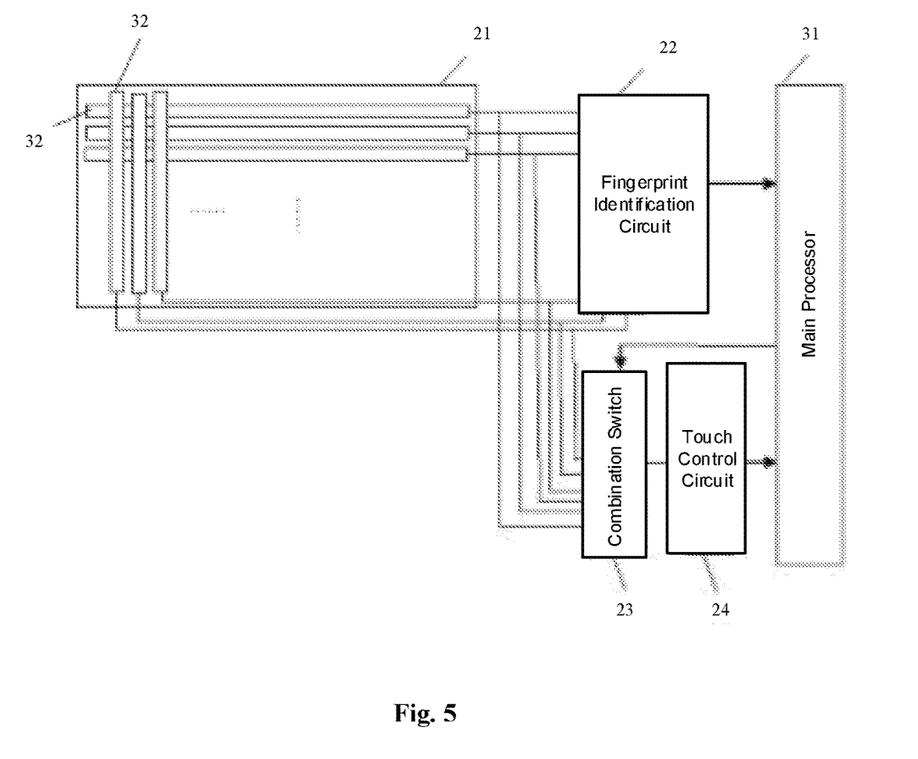
FIG. 5 is a block diagram illustrating an apparatus for implementing touch control and fingerprint identification according to an exemplary embodiment.

FIG. 5 is a block diagram illustrating an apparatus for implementing touch control and fingerprint identification according to an exemplary embodiment. As shown in FIG. 5, the apparatus includes a fingerprint identification sensor 21, a fingerprint identification circuit 22, a combination switch 23 and a touch control circuit 24, wherein the fingerprint identification sensor 21 includes a plurality of sub-sensors 32 which are arranged in a rectangular array. As shown in FIG. 3, the plurality of sub-sensors 32 may be also arranged in a dot array.

In the present embodiment, both the fingerprint identification function and the touch control function are implemented by using an additional touch control mechanism based on a fingerprint identification mechanism, wherein the touch control mechanism and the fingerprint identification mechanism share the sensor.

The combination switch 23 is open circuited or closed according to an instruction from a main processor 31 in the terminal device. When the main processor instructs to identify a fingerprint, the combination switch 23 is open circuited, and the signals from the respective sub-sensors 32 may be obtained by the fingerprint identification circuit 22 so as to implement the fingerprint identification function. Otherwise, when the main processor 31 instructs to sense a finger touch, the combination switch 23 is closed, and all of the sub-sensors 32 are combined into a bigger sensing component through which a finger touch signal may be obtained by the touch control circuit 24, so as to implement the finger touch control function. According to requirement of the upper level processor, such as a main processor 31, the respective sub-sensors may be combined into a bigger sensing component to provide the touch control circuit 24 with a signal of sufficient energy level, the sensitivity, response area and response speed required by the finger touch control function can be ensured.

In an embodiment, the fingerprint identification circuit 22 may include: a signal processing sub-module configured to convert the signal generated by the detection of the plurality of sub-sensors 32 into a digital signal and transmit the digital signal to the main processor 31 in the terminal device.

For example, the signal generated by detection of the plurality of sub-sensors 32 may be processed by filtering, amplification and sampling so as to convert the signal generated by the detection of the sub-sensors 32 into the digital signal.

In an embodiment, the fingerprint identification circuit 22 may include an image generation sub-module configured to generate a fingerprint image based on the signal generated by the detection of the plurality of sub-sensors 32 and transmit the fingerprint image to the main processor 31 in the terminal device.

In an embodiment, the fingerprint identification circuit 22 may include a comparison sub-module configured to generate a fingerprint image based on the signal generated by the detection of the plurality of sub-sensors 32, compare the fingerprint image with a sample image and transmit a comparison result to the main processor 31 in the terminal device.

In an embodiment, the touch control circuit 24 may include a determination sub-module configured to determine presence of the touch operation according to the combined touch signal and transmit a determination result to the main processor 31 in the terminal device.

In the present disclosure, separate ICs (Integrated Circuits) are used for processing signals but the sensor can be shared, as shown in the drawings described above. Moreover, various components can be integrated together. For example, the combination switch 23 and the touch control circuit 24 may be integrated into a single IC, the combination switch 23 and the fingerprint identification circuit 22 may be integrated into a single IC, and the combination switch 23, the fingerprint identification circuit 22 and the touch control circuit 24 may be integrated into a single IC, so as to provided a highly integrated solution.

The technical solutions according to embodiments of the present disclosure may provide, at least in part, the following advantageous effects. Both the functions of fingerprint identification and touch control are implemented by sharing the fingerprint identification sensor, and external components for implementing the functions of fingerprint identification and touch control are integrated into a single component without needing an additional physical button, so that the integration level of an electronic device is improved. Also, it is more convenient for users to use such device.

A terminal device is further provided by the present disclosure, which includes the apparatus for implementing touch control and fingerprint identification according to any one embodiment described above.

In an embodiment, the terminal device includes the apparatus for implementing touch control and fingerprint identification according to any one embodiment described above and a main processor.

The technical solutions according to embodiments of the present disclosure may provide, at least in part, the following advantageous effects. The functions of fingerprint identification and touch control are implemented by sharing the fingerprint identification sensor, and external components for implementing the functions of fingerprint identification and touch control are integrated into a single component without needing an additional physical button, so that the integration level of the electronic device is improved. Also, it is more convenient for users to use such device.

Figure 6:
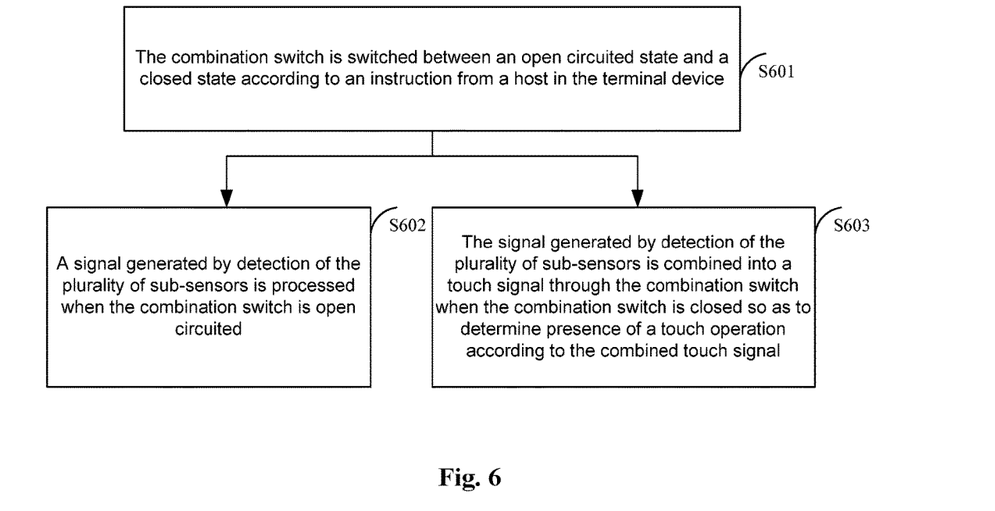
FIG. 6 is a flow chart illustrating a method for implementing touch control and fingerprint identification according to an exemplary embodiment.

FIG. 6 is a flow chart illustrating a method for implementing touch control and fingerprint identification, which can be used in a terminal device such as a mobile phone, a tablet computer or the like, according to an exemplary embodiment. The terminal device includes a combination switch and a fingerprint identification sensor with a plurality of sub-sensors. Herein, the plurality of sub-sensors may be arranged in a dot array or in a rectangular array. As shown in FIG. 6, the method includes steps S601-S603.

In step S601, an instruction from a main processor in the terminal device is received. The instruction indicates to switch the combination switch between an open circuited (off) state and a closed(on) state.

In step S602, a signal generated by detection of the plurality of sub-sensors is processed when the combination switch is open circuited.

In an embodiment, the step S602 for processing the signal generated by the detection of the plurality of sub-sensors may include: converting the signal generated by the detection of the plurality of sub-sensors into a digital signal and transmitting the digital signal to a main processor in the terminal device.

For example, the signal generated by the detection of the plurality of sub-sensors may be processed by including filtering, amplification and sampling so as to convert it into the digital signal.

In the present embodiment, the signal generated by the detection of the plurality of sub-sensors is converted into the digital signal which is then transmitted to the main processor in the terminal device. Accordingly, the main processor in the terminal device can generate a fingerprint image based on the digital signal received and compare the fingerprint image with a sample image to obtain a comparison result. Further operations may be performed according to the comparison result. For example, it may be determined whether to unlock the terminal device according to the comparison result: the terminal device may be unlocked if the comparison result indicates consistency between the sample image and the generated fingerprint image, and the terminal device may be locked if the comparison result indicates inconsistency.

In an embodiment, the step S602 for processing the signal generated by the detection of the plurality of sub-sensors may include: generating a fingerprint image based on the signal generated by the detection of the plurality of sub-sensors and transmitting the fingerprint image to a main processor in the terminal device.

In the present embodiment, the fingerprint image is generated based on the signal generated by the detection of the plurality of sub-sensors and transmitted to the main processor in the terminal device. Accordingly, the main processor in the terminal device can compare the fingerprint image with a sample image to obtain a comparison result. Further operations may be performed according to the comparison result. For example, it may be determined whether to unlock the terminal device according to the comparison result. The terminal device may be unlocked if the comparison result indicates consistency between the sample image and the generated fingerprint image, while the terminal device may be locked if the comparison result indicates inconsistency.

In an embodiment, the step S602 for processing the signal generated by the detection of the plurality of sub-sensors may include: generating a fingerprint image based on the signal generated by the detection of the plurality of sub-sensors, comparing the fingerprint image with a sample image and transmitting a comparison result to a main processor in the terminal device.

In the present embodiment, a fingerprint image is generated based on the signal generated by the detection of the plurality of sub-sensors and compared with a sample image to obtain a comparison result which is then transmitted to the main processor in the terminal device. Thus, the main processor in the terminal device can perform further operations according to the comparison result. For example, it may be determined whether to unlock the terminal device according to the comparison result. The terminal device may be unlocked if the comparison result indicates consistency between the sample image and the generated fingerprint image while the terminal device may be locked if the comparison result indicates inconsistency.

Alternatively, in step S603, the signal generated by the detection of the plurality of sub-sensors is combined into a touch signal through the combination switch when the combination switch is closed, and it is determined presence of a touch operation according to the combined touch signal.

In an embodiment, the step of determining presence of a touch operation according to the combined touch signal may include: determining the presence of the touch operation according to the combined touch signal and transmitting a determination result to a main processor in the terminal device.

For example, the combination switch is open circuited or closed according to an instruction from the main processor in the terminal device. When the main processor requires to identify a fingerprint (for example, when the terminal device displays a user interface to ask a user to input his fingerprint), the combination switch is open circuited, and signals from the respective sub-sensors may be obtained so as to implement the function of fingerprint identification. Otherwise, when the main processor requires to sense a finger touch (for example, when the terminal device is operated with an application which needs a user to input a touch control signal), the combination switch is closed, and all of the sub-sensors are combined into a bigger sensing component through which a finger touch signal may be obtained, so as to implement the finger touch control function. According to the requirements of the upper-level main processor, the respective sub-sensors may be combined into the bigger sensing component to provide a signal of sufficient energy level, and the sensitivity, response area and response speed required by the finger touch control function can be ensured.

The technical solutions according to embodiments of the present disclosure may provide, at least in part, the following advantageous effects. The fingerprint identification and touch control function can be implemented by sharing the fingerprint identification sensor, and external components for implementing the fingerprint identification and touch control are integrated into a single component without needing an additional physical button, so that the integration level of the electronic device is improved and it is more convenient for users to use such device.

Figure 7:
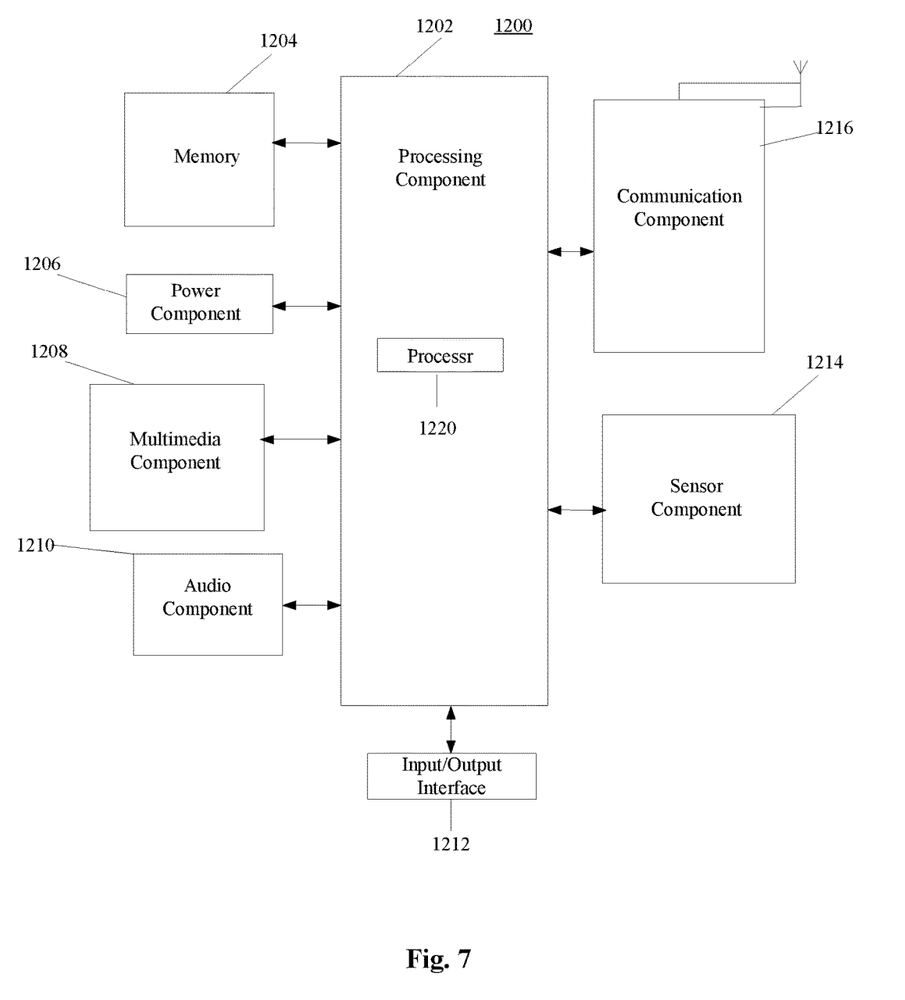
FIG. 7 is a block diagram illustrating a terminal device for implementing touch control and fingerprint identification according to an exemplary embodiment.

FIG. 7 is a block diagram illustrating a terminal device 1200 for implementing touch control and fingerprint identification. According to the present disclosure, the terminal device 1200 may include the apparatuses for implementing touch control and fingerprint identification described above. For example, the terminal device 1200 may be a mobile phone, a computer, a digital broadcast terminal, a messaging device, a gaming console, a tablet device, a medical device, exercise equipment, a personal digital assistant, and the like.

Referring to FIG. 7, the terminal device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal device 1200, such as the operations associated with display, telephone calls, data communications, camera operations, and recording operations. The processing component 1202 may include one or more processors 1220 to perform as the main processor to communicate with the apparatuses for implementing touch control and fingerprint identification described above. Furthermore, the processing component 1202 may include a processor to perform the methods for implementing touch control and fingerprint identification described above. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the terminal device 1200. Examples of such data include instructions for any applications or methods operated on the terminal device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the terminal device 1200. The power component 1206 may include a power management system, one or more power sources, and any other components associated with the generation, management, and distribution of power in the terminal device 1200.

The multimedia component 1208 includes a screen providing an output interface between the terminal device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the terminal device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the terminal device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like.

The buttons may include, but are not limited to, a home button, a volume button, a starting button, and a locking button.

The sensor component 1214 includes one or more sensors to provide status assessments of various aspects of the terminal device 1200. For instance, the sensor component 1214 may detect an open/closed status of the terminal device 1200, relative positioning of components, e.g., the display and the keypad, of the terminal device 1200, a change in position of the terminal device 1200 or a component of the terminal device 1200, a presence or absence of user contact with the terminal device 1200, an orientation or an acceleration/deceleration of the terminal device 1200, and a change in temperature of the terminal device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the terminal device 1200 and other devices. The terminal device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the terminal device 1200, for performing the above-described methods. For example, the non-transitory computer-readable storage medium may be a ROM, a RAM, a CD-ROM, a magnetic tape, a floppy disc, an optical data storage device, and the like.

A device for implementing functions of touch control and fingerprint identification, including: a processor; and a memory for storing instructions executable by the processor; wherein the processor is configured to perform: receiving an instruction from a main processor in the terminal device, wherein the instruction indicates to switch the combination switch between an open-circuited state and a closed state; and processing a signal generated by detection of the plurality of sub-sensors when the combination switch is open circuited; or combining the signal generated by the detection of the plurality of sub-sensors into a touch signal through the combination switch when the combination switch is closed and determining presence of a touch operation according to the combined touch signal.

The processor is configured to perform: converting the signal generated by the detection of the plurality of sub-sensors into a digital signal and transmitting the digital signal to a main processor in the terminal device.

The processor is configured to perform: generating a fingerprint image based on the signal generated by the detection of the plurality of sub-sensors and transmitting the fingerprint image to a main processor in the terminal device.

The processor is configured to perform: generating a fingerprint image based on the signal generated by the detection of the plurality of sub-sensors, comparing the fingerprint image with a sample image and transmitting a comparison result to a main processor in the terminal device.

The processor is configured to perform: determining presence of the touch operation according to the combined touch signal and transmitting a determination result to a main processor in the terminal device.

A non-transitory computer readable storage medium is provided, wherein instructions in the storage medium are executed by a processor of a mobile terminal, which enables the mobile terminal to perform a method for implementing touch control and fingerprint identification. The method includes: receiving an instruction from a main processor in the terminal device, wherein the instruction indicates to switch the combination switch between an open-circuited state and a closed state; and processing a signal generated by detection of the plurality of sub-sensors when the combination switch is open circuited; or combining the signal generated by the detection of the plurality of sub-sensors into a touch signal through the combination switch when the combination switch is closed and determining presence of a touch operation according to the combined touch signal.

The step for processing the signal generated by the detection of the plurality of sub-sensors may include: converting the signal generated by the detection of the plurality of sub-sensors into a digital signal and transmitting the digital signal to a main processor in the terminal device.

The step for processing the signal generated by the detection of the plurality of sub-sensors may include: generating a fingerprint image based on the signal generated by the detection of the plurality of sub-sensors and transmitting the fingerprint image to a main processor in the terminal device.

The step for processing the signal generated by the detection of the plurality of sub-sensors may include: generating a fingerprint image based on the signal generated by the detection of the plurality of sub-sensors, comparing the fingerprint image with a sample image and transmitting a comparison result to a main processor in the terminal device.

The step for determining presence of a touch operation according to the combined touch signal may include: determining the presence of the touch operation according to the combined touch signal and transmitting a determination result to a main processor in the terminal device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An apparatus for implementing touch control and fingerprint identification, comprising: a fingerprint identification sensor, a fingerprint identification circuit, a combination switch and a touch control circuit, wherein
the fingerprint identification sensor comprises a plurality of sub-sensors; the plurality of sub-sensors are coupled to the fingerprint identification circuit, respectively, and coupled to the combination switch, respectively; and the combination switch is coupled to the touch control circuit;
the fingerprint identification sensor is configured to transmit a signal generated by detection of the plurality of sub-sensors to the fingerprint identification circuit when the combination switch is open circuited, and to combine the signal generated by the detection of the plurality of sub-sensors into a touch signal through the combination switch and transmit the touch signal to the touch control circuit when the combination switch is closed;
the fingerprint identification circuit is configured to process the signal generated by the detection of the plurality of sub-sensors; and
the touch control circuit is configured to determine presence of a touch operation according to the combined touch signal.

2. The apparatus of claim 1, wherein the combination switch is open circuited or closed according to an instruction from a main processor in a terminal device.

3. The apparatus of claim 1, wherein the plurality of sub-sensors are arranged in a dot array or in a rectangular array.

4. The apparatus of claim 1, wherein the fingerprint identification circuit comprises:
a signal processing sub-module configured to convert the signal generated by the detection of the plurality of sub-sensors into a digital signal and transmit the digital signal to a main processor in a terminal device.

5. The apparatus of claim 1, wherein the fingerprint identification circuit comprises:
an image generation sub-module configured to generate a fingerprint image based on the signal generated by the detection of the plurality of sub-sensors and transmit the fingerprint image to a main processor in a terminal device.

6. The apparatus of claim 1, wherein the fingerprint identification circuit comprises:
a comparison sub-module configured to generate a fingerprint image based on the signal generated by the detection of the plurality of sub-sensors, compare the fingerprint image with a sample image and transmit a comparison result to a main processor in a terminal device.

7. The apparatus of claim 1, wherein the touch control circuit comprises:
a determination sub-module configured to determine presence of the touch operation according to the combined touch signal and transmit a determination result to a main processor in a terminal device.

8. A method for implementing touch control and fingerprint identification, which can be used in a terminal device comprising a combination switch and a fingerprint identification sensor with a plurality of sub-sensors,
wherein the method comprises:
receiving an instruction from a main processor in the terminal device, wherein the instruction indicates to switch the combination switch between an open-circuited state and a closed state; and
processing a signal generated by detection of the plurality of sub-sensors when the combination switch is open circuited; and
combining the signal generated by the detection of the plurality of sub-sensors into a touch signal through the combination switch when the combination switch is closed, and determining presence of a touch operation according to the combined touch signal.

9. The method of claim 8, wherein the plurality of sub-sensors are arranged in a dot array or in a rectangular array.

10. The method of claim 8, wherein processing the signal generated by the detection of the plurality of sub-sensors comprises:
converting the signal generated by the detection of the plurality of sub-sensors into a digital signal and transmitting the digital signal to a main processor in the terminal device.

11. The method of claim 8, wherein processing the signal generated by the detection of the plurality of sub-sensors comprises:
generating a fingerprint image based on the signal generated by the detection of the plurality of sub-sensors and transmitting the fingerprint image to a main processor in the terminal device.

12. The method of claim 8, wherein processing the signal generated by the detection of the plurality of sub-sensors comprises:
generating a fingerprint image based on the signal generated by the detection of the plurality of sub-sensors, comparing the fingerprint image with a sample image and transmitting a comparison result to a main processor in the terminal device.

13. The method of claim 8, wherein determining presence of a touch operation according to the combined touch signal comprises:
determining presence of the touch operation according to the combined touch signal and transmitting a determination result to a main processor in the terminal device.

14. An apparatus for implementing touch control and fingerprint identification, comprising:
a fingerprint identification circuit;
a touch control circuit;
a combination switch coupled to the touch control circuit; and
a fingerprint identification sensor comprising a plurality of sub-sensors coupled to the fingerprint identification circuit, respectively and coupled to the combination switch, respectively, wherein the fingerprint identification sensor is configured to:
transmit signals generated by the plurality of sub-sensors to the fingerprint identification circuit respectively for processing when the combination switch is open circuited; and
transmit a touch signal to the touch control circuit for determining presence of a touch operation when the combination switch is closed, the touch signal being obtained by combining signals generated by the plurality of sub-sensors through the combination switch.

\* \* \* \* \*